(12) United States Patent
Mallinson

(10) Patent No.: US 8,739,304 B2
(45) Date of Patent: *May 27, 2014

(54) PROVIDING CONTENT USING HYBRID MEDIA DISTRIBUTION SCHEME WITH ENHANCED SECURITY

(75) Inventor: Dominic Saul Mallinson, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 790 days.

This patent is subject to a terminal disclaimer.

(21) Appl. No.: 11/696,117

(22) Filed: Apr. 3, 2007

(65) Prior Publication Data

US 2008/0115229 A1 May 15, 2008

Related U.S. Application Data

(63) Continuation-in-part of application No. 11/558,803, filed on Nov. 10, 2006.

(51) Int. Cl.
*H04L 29/06* (2006.01)

(52) U.S. Cl.
USPC .................. 726/28; 726/13; 726/27; 726/29; 726/30

(58) Field of Classification Search
USPC ................................................ 726/26–30, 13
See application file for complete search history.

(56) References Cited

U.S. PATENT DOCUMENTS

| | | | |
|---|---|---|---|
| 5,799,128 A | 8/1998 | Van Den Enden | |
| 5,991,503 A | 11/1999 | Miyasaka et al. | |
| 6,275,536 B1 | 8/2001 | Chen et al. | |
| 7,024,156 B2 * | 4/2006 | Kawamata et al. | 455/3.02 |
| 7,165,175 B1 | 1/2007 | Kollmyer et al. | |
| 7,260,690 B2 * | 8/2007 | Brucklmayr et al. | 711/152 |
| 7,386,128 B2 | 6/2008 | Moroney | |
| 7,437,082 B1 | 10/2008 | Smith | |
| 7,596,625 B2 * | 9/2009 | Manion et al. | 709/232 |
| 7,613,298 B2 * | 11/2009 | LeComte et al. | 380/201 |
| 7,639,833 B2 * | 12/2009 | LeComte et al. | 382/100 |
| 7,643,478 B2 * | 1/2010 | Lecomte et al. | 370/389 |
| 7,647,642 B2 * | 1/2010 | Erickson | 726/27 |

(Continued)

FOREIGN PATENT DOCUMENTS

WO 2006078029 A1 7/2006

OTHER PUBLICATIONS

Dimitris Thanos et al., Commercial Dissemination of Video over Open Networks: Issues and Approaches, 2000, Retrieved from http://asg.unige.ch/site/papers/ThKo01.pdf, pp. 1-14.*

(Continued)

*Primary Examiner* — Chau Le
(74) *Attorney, Agent, or Firm* — Fitch, Even, Tabin & Flannery, LLP

(57) ABSTRACT

A method for use in providing content that is made up of data includes providing a first portion of the data making up the content to a user, and making available for a limited amount of time an ability to stream a second portion of the data making up the content to a device having the first portion of the data. The second portion of the data includes essential information for reconstructing the content from the first portion of the data. Also disclosed are a storage medium storing a computer program for causing a processor based system to assist with providing content, and a system for use in providing content.

25 Claims, 7 Drawing Sheets

(56) References Cited

U.S. PATENT DOCUMENTS

| | | | |
|---|---|---|---|
| 7,668,312 B2* | 2/2010 | Lecomte et al. | 380/210 |
| 7,983,440 B1 | 7/2011 | Roberts et al. | |
| 2002/0026636 A1* | 2/2002 | LeComte | 725/31 |
| 2002/0056095 A1* | 5/2002 | Uehara et al. | 725/38 |
| 2002/0080971 A1 | 6/2002 | Fukami et al. | |
| 2002/0095582 A1 | 7/2002 | Peled et al. | |
| 2002/0104019 A1 | 8/2002 | Chatani et al. | |
| 2002/0159750 A1* | 10/2002 | Jasinschi et al. | 386/46 |
| 2002/0170053 A1* | 11/2002 | Peterka et al. | 725/31 |
| 2003/0135700 A1* | 7/2003 | Schultz et al. | 711/154 |
| 2003/0200548 A1 | 10/2003 | Baran et al. | |
| 2004/0049694 A1* | 3/2004 | Candelore | 713/200 |
| 2004/0123125 A1 | 6/2004 | Zuili | |
| 2004/0139027 A1 | 7/2004 | Molaro | |
| 2005/0076183 A1* | 4/2005 | Medvinsky et al. | 711/163 |
| 2005/0122430 A1 | 6/2005 | Lee et al. | |
| 2005/0193205 A1 | 9/2005 | Jacobs et al. | |
| 2005/0201726 A1 | 9/2005 | Malcolm et al. | |
| 2005/0223107 A1 | 10/2005 | Mine et al. | |
| 2005/0262573 A1 | 11/2005 | Bo et al. | |
| 2006/0259433 A1 | 11/2006 | Lahtinen et al. | |
| 2007/0050851 A1* | 3/2007 | Musha et al. | 726/27 |
| 2007/0061568 A1 | 3/2007 | Lee et al. | |
| 2007/0071239 A1 | 3/2007 | Fang | |
| 2007/0078731 A1* | 4/2007 | Hameen-Anttila et al. | 705/27 |
| 2007/0094272 A1* | 4/2007 | Yeh | 707/10 |
| 2007/0201695 A1 | 8/2007 | Saarikivi | |
| 2007/0250912 A1* | 10/2007 | Rassool et al. | 726/4 |
| 2008/0092240 A1* | 4/2008 | Sitrick et al. | 726/27 |
| 2008/0115045 A1 | 5/2008 | Mallinson | |
| 2008/0216177 A1* | 9/2008 | Yokosato et al. | 726/26 |
| 2008/0263611 A1* | 10/2008 | Lecomte | 725/114 |
| 2009/0055932 A1 | 2/2009 | Kuroda | |
| 2012/0079514 A1 | 3/2012 | Riedl et al. | |

OTHER PUBLICATIONS

USPTO; U.S. Appl. No. 11/558,803 Final Office Action mailed Jan. 5, 2009.

Pending Unpublished U.S. Patent Application by Mallinson, Dominic Saul; U.S. Appl. No. 11/558,803, filed Nov. 10, 2006, entitled "Hybrid Media Distribution with Enhanced Security", 22 pages, which includes the application specification, claims, and drawings.

USPTO; Office Action issued in U.S. Appl. No. 11/558,803; dated Apr. 29, 2008; 11 pages.

USPTO; Office Action issued in U.S. Appl. No. 11/558,803; mailed May 4, 2009; 9 pages.

USPTO; Final Office Action issued in U.S. Appl. No. 11/558,803; mailed Oct. 21, 2009; 10 pages.

USPTO; Non-Final Office Action issued in U.S. Appl. No. 11/558,803; mailed Jun. 30, 2010; 13 pages.

USPTO; Final Office Action issued in U.S. Appl. No. 11/558,803; mailed Nov. 24, 2010; 16 pages.

USPTO; Office Action issued in U.S. Appl. No. 11/558,803; mailed Mar. 23, 2011; 11 pages.

USPTO; Final Office Action issued in U.S. Appl. No. 11/558,803; mailed Oct. 25, 2011; 11 pages.

USPTO; Notice of Panel Decision from Pre-Appeal Brief Review for U.S. Appl. No. 11/558,803, mailed Mar. 1, 2010, 2 pages.

USPTO; Office Action issued in U.S. Appl. No. 11/558,803, mailed Dec. 18, 2012, 11 pages.

USPTO; Final Office Action issued in U.S. Appl. No. 11/558,803, mailed Jul. 22, 2013, 11 pages.

Japanese Patent Office, Japanese Application No. 2005-015964, dated Jan. 24, 2005, 38 pages.

USPTO; Office Action issued in U.S. Appl. No. 11/558,803, mailed Oct. 22, 2013, 14 pages.

USPTO; Notice of Allowance issued in U.S. Appl. No. 11/558,803, mailed Feb. 3, 2014, 9 pages.

* cited by examiner

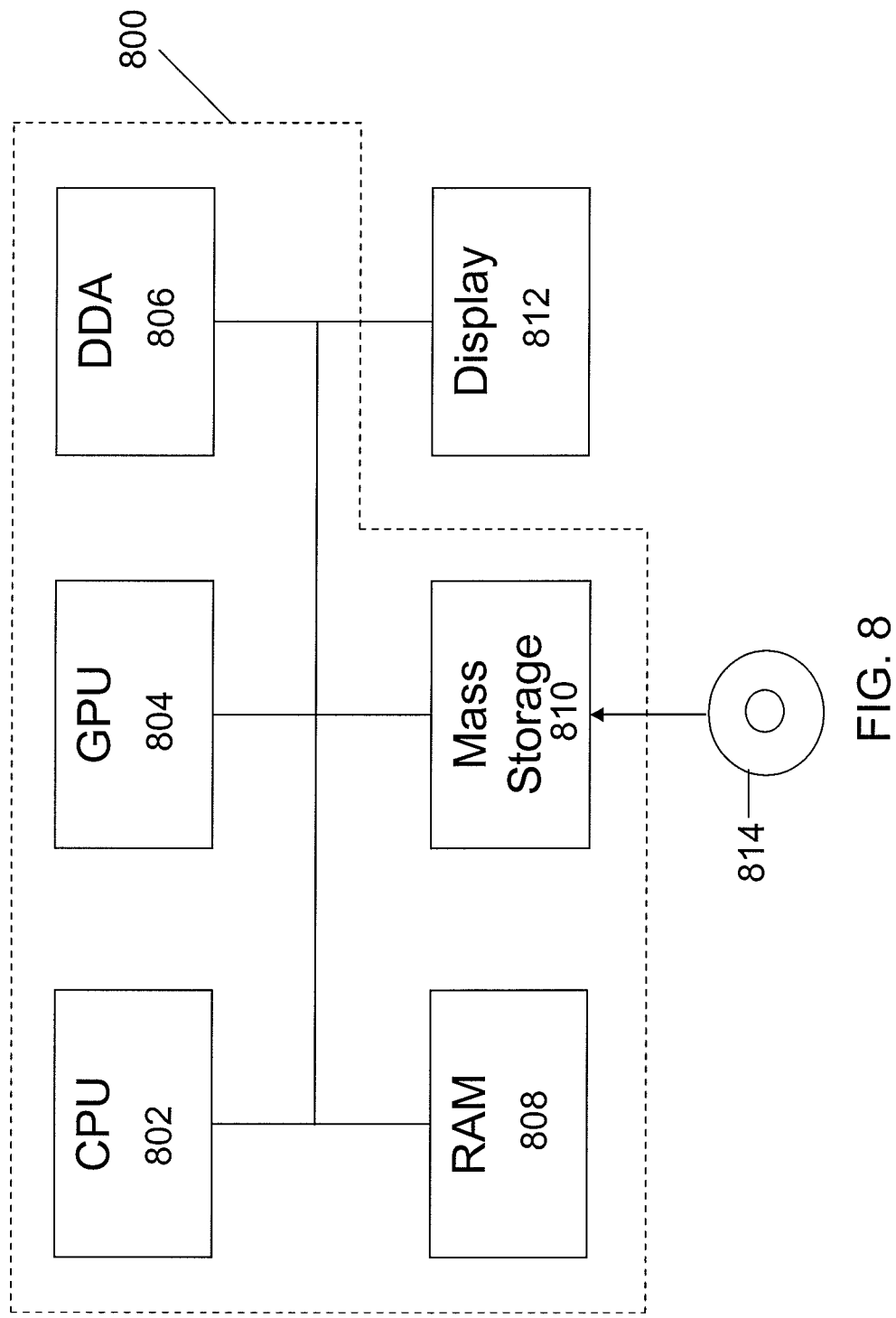

PROVIDING CONTENT USING HYBRID MEDIA DISTRIBUTION SCHEME WITH ENHANCED SECURITY

CROSS-REFERENCE TO RELATED APPLICATIONS

This application is a continuation-in-part (CIP) of U.S. patent application Ser. No. 11/558,803, filed on Nov. 10, 2006, entitled "HYBRID MEDIA DISTRIBUTION WITH ENHANCED SECURITY", which is hereby incorporated by reference herein in its entirety.

BACKGROUND OF THE INVENTION

1. Field of the Invention

The present invention relates generally to the security of digital content, and more specifically to media copy protection schemes.

2. Discussion of the Related Art

The proliferation of digital content and the ability to make unlimited generations of perfect copies of such content has provided consumers, distributors and content providers with immense convenience, efficiency and flexibility. Digital content can be easily copied onto physical media such as DVDs, CDs, hard disc drives, USB storage devices, etc., and can also be easily distributed via the Internet. Unfortunately, however, such conveniences also provide a wealth of opportunities to those who endeavor to make illegal copies of such content and/or illegally distribute such content via the Internet.

It is with respect to these and other background information factors that the present invention has evolved.

SUMMARY OF THE INVENTION

One embodiment provides a method for use in providing content that is made up of data, comprising: providing a first portion of the data making up the content to a user; and making available for a limited amount of time an ability to stream a second portion of the data making up the content to a device having the first portion of the data; wherein the second portion of the data includes essential information for reconstructing the content from the first portion of the data.

Another embodiment provides a storage medium storing a computer program executable by a processor based system, the computer program causing the processor based system to assist with providing content that is made up of data by executing steps comprising: receiving from a device having a first portion of the data making up the content an indication that the device is attempting to play the content; and making available for a limited amount of time an ability to stream a second portion of the data making up the content to the device; wherein the second portion of the data includes essential information for reconstructing the content from the first portion of the data.

Another embodiment provides a system for use in providing content that is made up of data, comprising: means for providing a first portion of the data making up the content to a user; and a processor based system configured to make available for a limited amount of time an ability to stream a second portion of the data making up the content to a device having the first portion of the data; wherein the second portion of the data includes essential information for reconstructing the content from the first portion of the data.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 8 is a block diagram illustrating a device/system that may be used to run, implement and/or execute the methods shown and described herein in accordance with embodiments of the present invention.

DETAILED DESCRIPTION

Further to the above discussion, one technique that has been used in an effort to provide security for digital content is to encrypt the content. Encryption technologies rely upon a very small key to decrypt the data. All of the data for the content is contained in the encrypted data. Therefore, unfortunately, if the encryption key is compromised, the data for the content is all available.

Embodiments of the present invention provide a hybrid media distribution scheme with enhanced security, thus providing copy protection that is believed to provide benefits over the above described encryption technique. In general, in some embodiments, any media or digital content, such as for example a movie, music, game, advertisement, etc., may be distributed in two parts. The first part may comprise unsecured raw data that can be downloaded or distributed by physical media and freely stored on any storage device, such as for example a DVD, DVD-R, HDD, etc.

The second part may comprise a much smaller percentage of the data that is essential to the whole. In some embodiments this second part of the data is only distributed by streaming it from a server to the client device. In some embodiments the streaming may be via a secure online transaction. In this way, this second part of the data is not stored and security methods can be updated to reduce vulnerability. The unsecured data of the first part is useless without the lower bandwidth second part of the data.

Figure 1A:
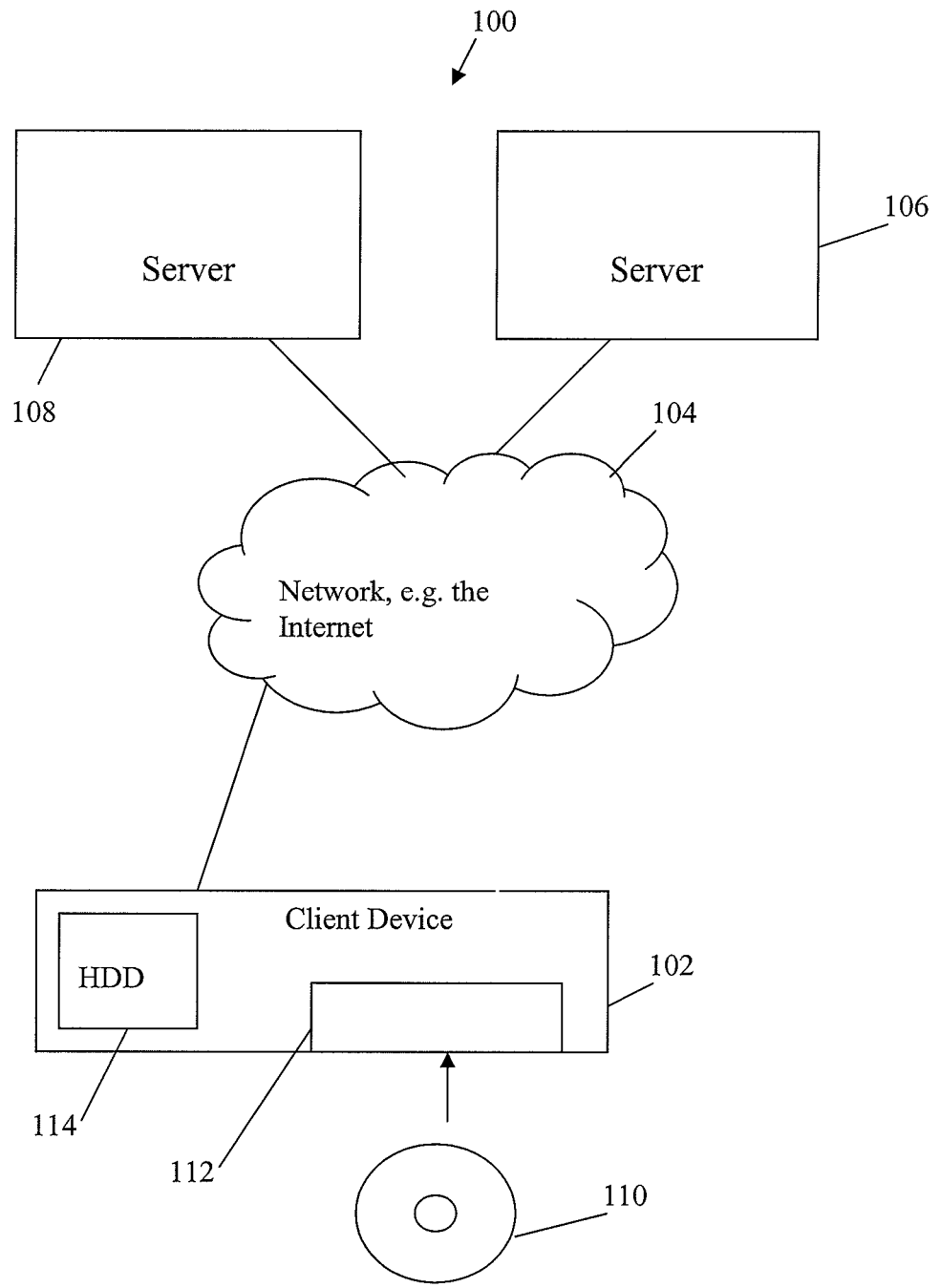
FIG. 1A is a block diagram illustrating a system that operates in accordance with an embodiment of the present invention.

By way of example, FIG. 1A illustrates a system 100 that operates in accordance with an embodiment of the present invention. The system 100 may include a client device 102 that is connected to a network 104, such as for example the Internet. By way of example, the client device 102 may comprise a DVD player, CD player, game console, entertainment system, handheld device, computer, or any other type of device that plays media. In some embodiments the client device 102 may comprise any platform having network connectivity. Also shown connected to the network 104 are servers 106 and 108.

In some embodiments the client device 102 may be capable of receiving physical storage media 110, which for example may comprise a DVD disc, Blu-ray disc, or any other type of media, that is inserted into a drive 112 in the client device 102. In some embodiments the bulk of the data for any type of digital content may be stored on the media 110. Again, the digital content may, for example, comprise a movie, music, game, advertisement, etc. The data stored on the media 110 may be unsecured and not encrypted.

In some embodiments the bulk of the data for the digital content may instead be downloaded from one of the servers 106, 108 and stored on a hard disc drive 114 in the client device 102. Again, this data may be unsecured and not encrypted.

Figure 1B:
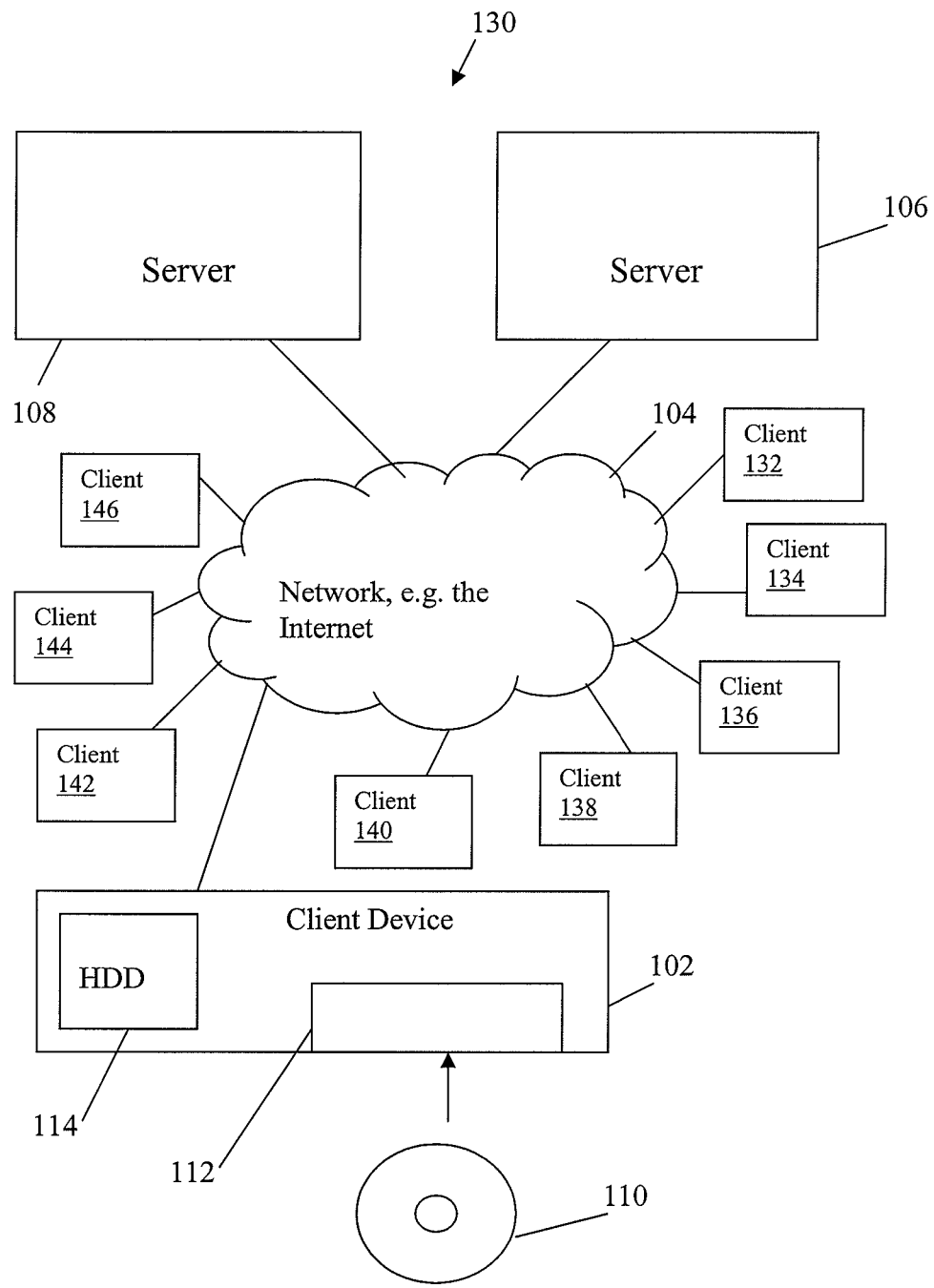
FIG. 1B is a block diagram illustrating a system that operates in accordance with another embodiment of the present invention.

In some embodiments, the bulk of the data for the digital content may be downloaded or otherwise acquired via a peer-to-peer (P2P) file sharing scheme or the like. For example, FIG. 1B illustrates a system 130 that operates in accordance with an embodiment of the present invention. The system 130 may include several other client computers or other devices 132, 134, 136, 138, 140, 142, 144 and 146 that are all connected to the network 104. The client device 102 and one or more of the other client devices 132, 134, 136, 138, 140, 142, 144 and 146 may form a P2P network. The client device 102 may download the bulk of the data for the digital content in pieces from the other peers.

In some embodiments, the P2P file sharing scheme may comprise a P2P file swarming scheme such as is available from BitTorrent, Inc. of San Francisco, Calif. Namely, the swarm may comprise the peer computers 102, 132, 134, 136, 138, 140, 142, 144 and 146, and a tracker may be used to tell the client device 102 from which other peers to download the pieces of the bulk data file. As such, the client device 102 may download or otherwise acquire the bulk of the data for the digital content via this or any other type of P2P file swarming scheme.

Referring back to FIG. 1A, in accordance with an embodiment of the present invention, the data stored on the media 110 or the hard disc drive 114 may be missing an essential quantity of information which makes the data impossible to use by itself. As such, a second smaller amount of data that fills in the blanks may be streamed over a low bandwidth connection. This small amount of data may be streamed from one of the servers 106, 108 over the network 104 to the client device 102. Because it is streamed, this small amount of data is typically not stored long term in the same place as the main data, which makes it harder to effectively copy. Network streaming is often inherently more secure since the method to secure it can be associated with a user authentication and can be changed.

Figure 2:
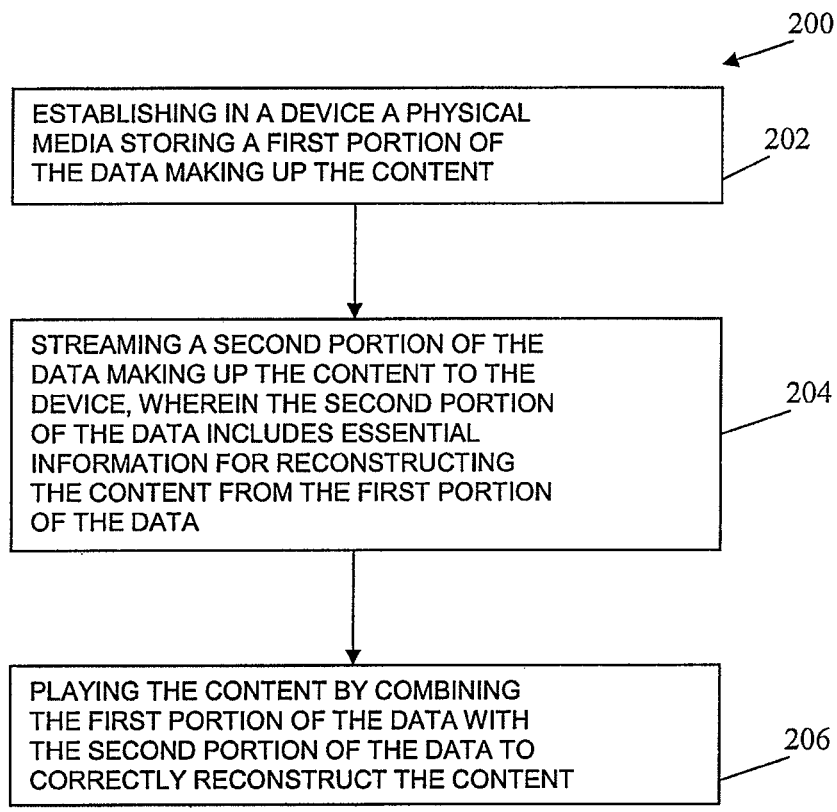
FIG. 2 is a flow diagram illustrating a method for use in playing content in accordance with an embodiment of the present invention.

Referring to FIG. 2, there is illustrated a method 200 that operates in accordance with an embodiment of the present invention. The method 200 may be used for playing content, which is typically made up of or comprises digital data. The method 200 begins in step 202 where a physical media storing a first portion of the data making up the content is established in a device, such as for example a client device. As described above, the physical media may comprise a removable storage device, a hard disc drive, or any other type of storage device.

On its own, the first portion of the data has very little value. This is because in some embodiments throughout the entire movie or other content some critical information of the encoding has been deliberately removed so that reconstitution is impossible based on the first portion of the data alone.

In step 204 a second portion of the data making up the content is streamed to and received by the device. The second portion of the data may include essential information for reconstructing the content from the first portion of the data. Thus, the second portion of the data, which may be referred to herein as "key data", may form a stream of essential information that can be combined with the first portion of the data (i.e. the bulk data) to correctly reconstitute the content. The second portion of the data may be much smaller in size than the first portion of the data.

In step 206 the content is played by combining the first portion of the data with the second portion of the data to correctly reconstruct the content. In some embodiments when the end user inserts the disc into the client device, such as any type of player, the client device may automatically connect to a server, authenticate the user, and start to stream the "key data." The authentication may be subscription based, pay per play, an all time purchase, or any other type of authentication. Because the key data may be so much smaller than the bulk data, the bandwidth and server requirements to stream the key data become much more reasonable even for high definition (HD) quality movies and content.

In some embodiments the security of the system may be further related to the authentication and encryption of the key data and the method of streaming this data to the client device. As with any streaming application, only enough information is stored locally on the client device to prevent stalls and skips due to sporadic network bandwidth. Since in some embodiments this data is also small, it is possible to store it purely in PAM with no persistent storage copy. Again, this makes encryption more secure since potential pirates will find it harder to locate an unencrypted version of the key data stream in RAM. In addition, in some embodiments the method of encryption can be changed if the publisher ever becomes aware of potential hacks or could even be changed regularly as a matter of course. All of these methods make it much harder for a pirate to get the whole key data stream.

Figure 3:
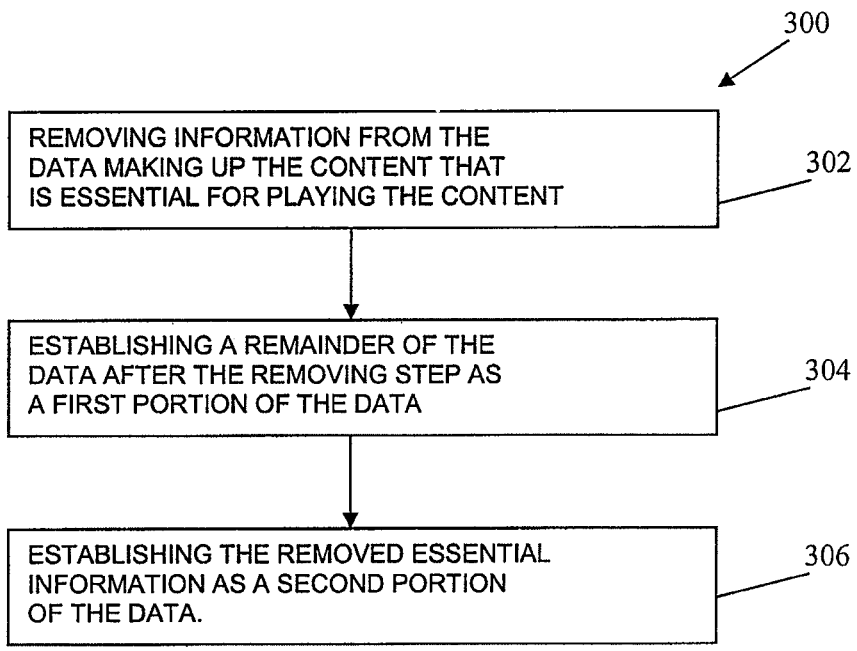
FIG. 3 is a flow diagram illustrating a method for use in enhancing the security of content in accordance with an embodiment of the present invention.

Examples of forming the first and second portions of the data will now be discussed. Referring to FIG. 3, there is illustrated a method 300 that operates in accordance with an embodiment of the present invention. The method 300 may be used in enhancing the security of content, which is typically made up of or comprises digital data. The method 300 begins in step 302 where information that is essential for playing the content is removed from the data making up the content. In step 304 a remainder of the data after the removing step is established as a first portion of the data, and in step 306 the removed essential information is established as a second portion of the data.

As an example application of the method 300, in some embodiments a movie that would normally be distributed on a standard DVD or Blu-ray disc may first be decomposed into two parts by the publisher, distributor, or some other party. This process may begin by first deliberately removing some critical information of the encoding throughout the entire movie so that reconstitution is impossible based on only the remaining data. The remaining bulk of the data may be stored on a physical media, such as for example a DVD or Blu-ray disc. On its own, this data has very little value. The second part of the data, which is the essential information that has been removed, is much smaller in size.

There are many techniques that may be used in accordance with various embodiments of the present invention to separate the bulk data from the key data. By knowing the type of data (e.g. AVC encoded movie), intelligent methods may be used to make sure that the bits and bytes removed from the bulk data are essential.

For example, standard DVDs are encoded with a modified version of the popular MPEG-2 format. An MPEG-2 video bit stream is made up of a series of data frames encoding pictures. The three ways of encoding a picture are: intra-coding (I pictures), forward prediction (P pictures), and bidirectional prediction (B pictures). In the case of I pictures, the actual image data is passed through the encoding process. P and B pictures are first subjected to a process of "motion estimation", in which the encoder searches for similarities with the previous (and in the case of B pictures, also the next) image in time order.

Figure 4:
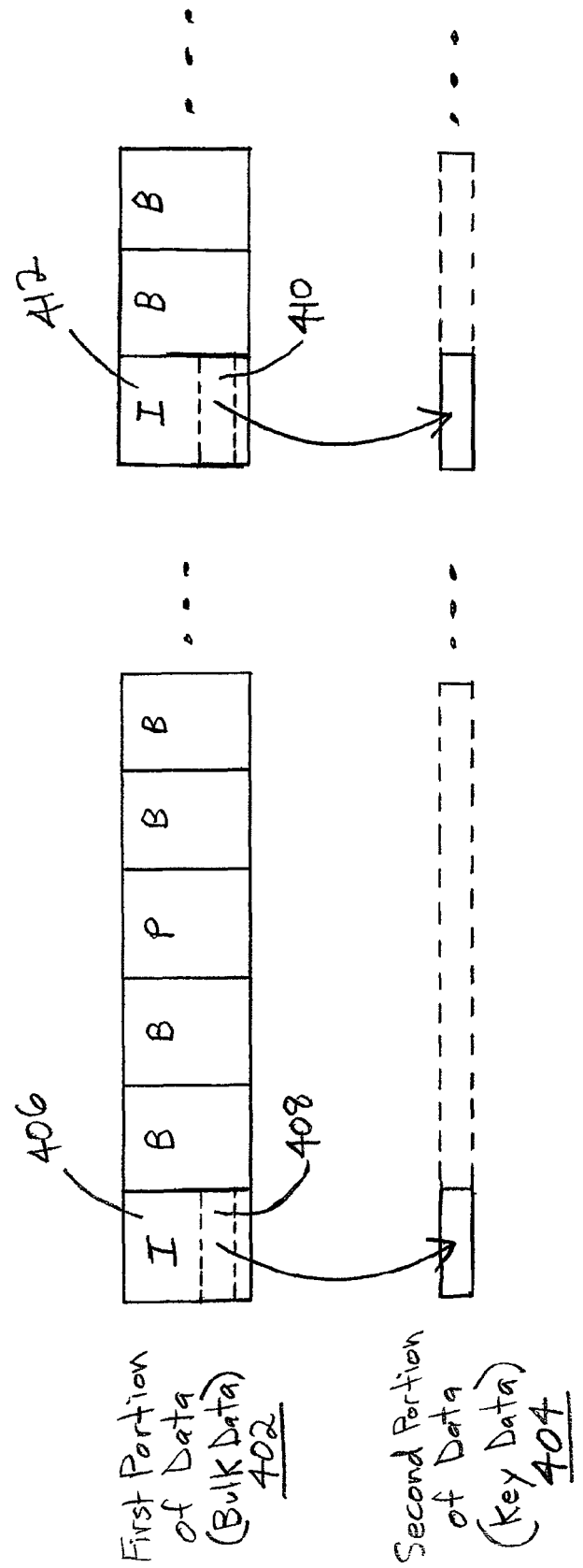
FIG. 4 is a timing diagram illustrating an example technique for separating bulk data from key data in accordance with an embodiment of the present invention.

Referring to FIG. 4, there is illustrated an example technique for separating the bulk data from the key data in accordance with an embodiment of the present invention. In this example, the step of removing essential information from the data making up the content may comprise removing at least a portion of one or more I pictures. Thus, as shown, a portion 408 of the first I picture 406 is removed from the bulk data 402 and established as part of the key data 404. Similarly, a portion 410 of the second I picture 412 is removed from the bulk data 402 and established as part of the key data 404. Because I pictures are critical in that the P and B pictures are based on motion estimation, the removal of at least a portion of one or more I pictures may make reconstitution of the content impossible based on the remaining bulk data 402 alone. The removed portions of the one or more I pictures are then established as the second portion of the data 404 for streaming to the client devices.

As discussed above, the second portion of the data 404 may be encrypted prior to streaming it to the client devices. And again, this secured second part of the data is typically not stored and security methods can be updated to reduce vulnerability. The unsecured first portion of the data 402 is useless without the lower bandwidth secured second part 404.

In some embodiments, it will not be apparent which data has been removed from the content and how the content is reconstituted. This knowledge may be embedded in the player application. Thus, in some embodiments tamper proofing methods for the player application and/or device may be used to further enhance security. That is, in some embodiments part of the security of the system may be to make the player sufficiently tamper proof that it is hard for a potential pirate to figure out what method was used for removing essential information. If a pirate does figure out how to record the decrypted key data stream for a movie, then it potentially unlocks the movie for everyone who has a disc.

Thus, in some embodiments this business risk may be considered and balanced by content owners in deciding how much tamper proofing and security to build into player applications and/or devices. But even in the scenario where a pirate discovers a way to record the decrypted key data stream, the pirate would still need to either re-master the whole movie or create a PC player application and allow the key-data to be downloaded to enable a pirated disc. It is anticipated that these avenues can be quickly shut down and will not be attractive to most honest users. Furthermore, in some embodiments regular changes to the application and the way in which the key data is separated, encrypted and reconstituted may be used to make it more difficult for hackers to enable discs.

As mentioned above, the methods and techniques described herein may be applied to any type of digital content. Thus, in some embodiments the same techniques may be applied to games and music. For example, for music a huge catalog of songs may be stored on a single DVD or Blu-ray disc. The songs would be worthless without the key data. And in some embodiments, for the case of lower bandwidth content such as music or some smaller games or movies for portable game devices, the bulk data may also be distributed online and downloaded in any unsecured fashion such as BitTorrent™ or file sharing methods.

In some embodiments, the techniques described herein may be used on the business/distribution side in distributing content to users. For example, in some embodiments a movie distribution system may be implemented by distributing the bulk data on physical media to users. The users would then insert the physical media into their players, which would then connect to the Internet to receive the streamed second portion of data.

In some embodiments the users may be authorized to receive the bulk data and/or the streamed second portion of data pursuant to a rental agreement or some other type of rental arrangement. Or, in some embodiments the users may be authorized to receive the bulk data and/or the streamed second portion of data pursuant to a purchase arrangement, or any other type of arrangement.

Such schemes may allow DVD discs, Blu-ray discs, etc., to be sent by standard postal mail or similar means to the end user. This differs from existing movie distribution schemes. Namely, the discs or other physical media never need to be returned. They can be kept by the end user or thrown away. This is because the discs have no value without the player and/or the authenticated key data stream.

Figure 5:
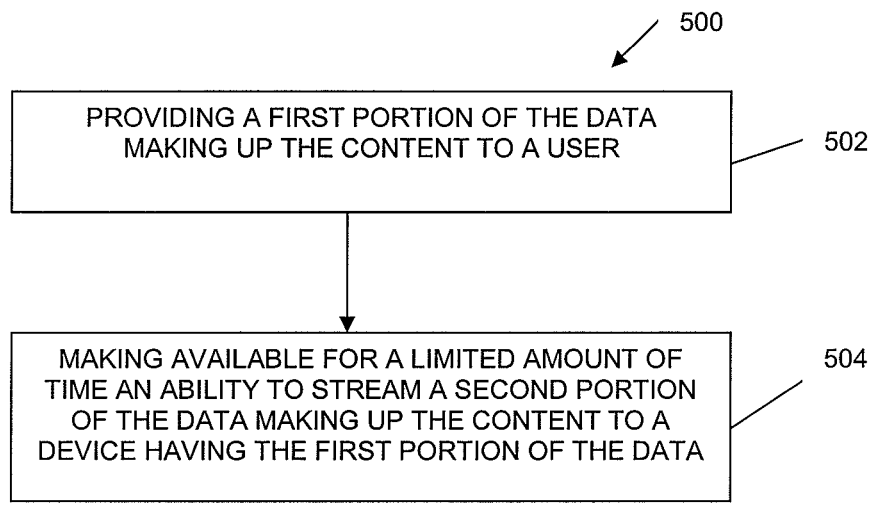
FIG. 5 is a flow diagram illustrating a method for use in providing content in accordance with an embodiment of the present invention.

As an example, FIG. 5 illustrates a method 500 that operates in accordance with an embodiment of the present invention. The method 500 may be used for providing content to users. Such content is typically made up of, or comprises, digital data.

The method 500 begins in step 502 where a first portion of the data making up the content is provided to a user. This step may be accomplished in many different ways or by many different means. For example, as mentioned above the first portion of the data may be provided to the user on a physical storage medium, such as for example a DVD, Blu-ray disc, or some other medium. In some embodiments the physical storage medium may be picked up by the user at a retail outlet, or in some embodiments the physical storage medium may be mailed to the user. In either of these scenarios the user may receive the physical storage medium pursuant to a rental agreement or other arrangement he or she may have with the provider of the physical storage medium.

In some embodiments, the first portion of the data may be provided to the user by downloading. For example, the user may visit a movie rental website and download the first portion of the data to his or her computer, entertainment system, game console, set-top box, etc. Similar to above, in some embodiments the user may be allowed or authorized to download the data pursuant to a rental agreement or other arrangement he or she may have with the provider of the data and/or website.

In some embodiments, the first portion of the data may be provided to the user in some other way.

In step 504, an ability to stream a second portion of the data making up the content to a device having the first portion of the data is made available for a limited amount of time. For example, in some embodiments the content, such as a movie, may be rented to a user by providing the first portion of the data to the user on a a DVD or Blu-ray disc, or by download, and then making the streamed second portion of the data available to the user for a limited amount of time. The limited amount of time may be specified in the rental agreement or other rental arrangement and may comprise any amount of time, such as for example 12 hours, 24 hours, 2 days, 3 days, 5 days, 7 days, etc.

Once the limited amount of time has expired, the user will preferably no longer be able to receive the streamed second portion of the data, which means the user will no longer be able to play the movie. This is because as described above the second portion of the data includes essential information for reconstructing the content from the first portion of the data. The user does not need to return the DVD or Blu-ray disc because, again, it is worthless without the second portion of the data. This saves the user the trouble or hassle of having to return discs to a retail outlet or mail them back to the provider. It also saves the provider of the disc the expense of having to collect the discs and make sure they are returned. And in embodiments where the user downloads the first portion of the data, the user does not need to delete or return the data because it is also worthless without the second portion of the data.

In some embodiments, as mentioned above, one or more of the servers 106, 108 (FIG. 1A) may be used as the source for downloading the first portion of the data to a client device. Or, as also described above, in some embodiments a client device may downloaded or otherwise acquire the first portion of the data via a peer-to-peer (P2P) file sharing scheme or the like (FIG. 1B).

In some embodiments, one or more of the servers 106, 108 may be used for streaming the second portion of the data to the client device. In such embodiments, a server or other processor based system may be configured to implement such functions.

Figure 6:
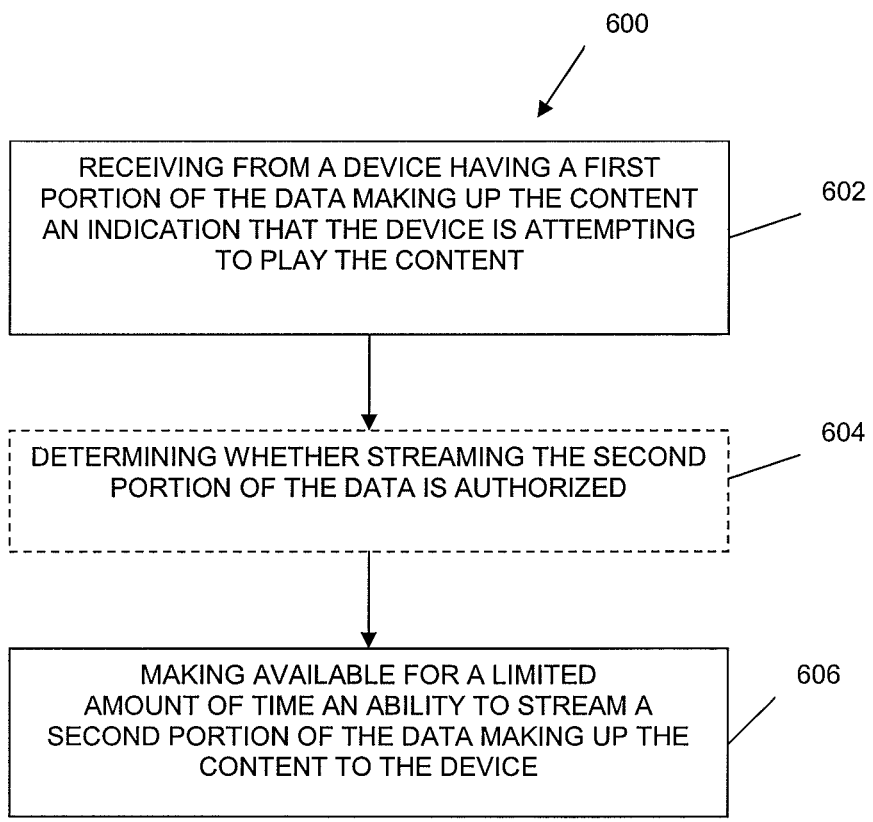
FIG. 6 is a flow diagram illustrating a method for use in providing content in accordance with an embodiment of the present invention.

As an example, FIG. 6 illustrates a method 600 that operates in accordance with an embodiment of the present invention. A server or other processor based system may be configured to execute the method 600. Specifically, in step 602 the server may be configured to receive from a client device having the first portion of the data an indication that the client device is attempting to play the content. This may occur, for example, when a user inserts a DVD or Blu-ray disc having the first portion of the data into a player or other client device and presses the "play" button. In some embodiments, upon reading the disc the player may be configured to automatically connect to the Internet and send to the server a request or other indication that the streamed second portion of data is needed.

In some embodiments, upon receiving such a request or other indication, the server may optionally be configured to determine whether or not streaming the second portion of the data to that particular client device is authorized, as is indicated by optional step 604. If it is authorized, the server may be further configured to make available for a limited amount of time an ability to stream the second portion of the data to the client device, as is indicated by step 606.

In some embodiments, the server may be configured to perform one or more of the above-described functions by running a computer program that causes execution of the functions.

In some embodiments, the extent to which a user may use the streamed second portion of the data may be limited. For example, in some embodiments only one such stream is made available at a time for a given first portion of the data. This may be specified in the content rental agreement. In this scenario, if a user makes copies of the first portion of the data and gives them to his or her friends, they will not be able to play the content simultaneously because only one stream of the second portion of the data will be provided at a time.

In some embodiments, such a scheme may be implemented by including in the first portion of the data a bulk data identification (ID) to identify the data. Such a bulk data ID may be included in the data whether it is provided on a disc, by downloading, via a P2P file sharing scheme, or by any other means. If copies of the first portion of the data are made, the copies will all have the same bulk data ID. Upon receiving a request for the streamed second portion of the data, the server may obtain the bulk data ID from the player to determine whether or not a stream is already being provided for that bulk data ID. If so, then the server may deny the request for the stream because in this embodiment only one stream of the second portion of the data may be provided at a time for a given bulk data ID.

The extent to which a user may use the streamed second portion of the data may be limited in other ways as well. For example, in some embodiments the stream may be provided to only a limited number or set of client devices. Namely, upon receiving a request for the streamed second portion of the data, the server may obtain the device ID from the player or other client device to determine whether or not that particular device is authorized to receive the streamed second portion of the data. If not, then the server may deny the request for the stream.

There are many different scenarios in which only a limited number of client devices may be authorized to receive the streamed second portion of the data. For example, a content rental agreement may provide that the stream will be provided to only a limited number of client devices. In one example, the rental agreement may provide that the stream will be provided to only one device. In this example the server may obtain the device ID from the first device requesting the stream. The server may grant the request for the stream from this first device, but then save the device ID and deny requests for the stream from any devices having different device IDs. This may help to prevent the playing of the content on multiple devices if that is the objective wanted by the provide of the content.

In another embodiment, the rental agreement may provide that the stream will be provided to some or all of the user's devices but no other devices for a given bulk data ID. This allows the user to use the disc or copy the first portion of the data to some or all of his or her devices and play the content on any of those devices, such as some or all of the devices in the user's home. In some embodiments, however, the rental agreement may still specify that the stream may not be provided to more than one device at a time.

The ability to limit the stream to being provided to only some or all of the user's devices may be accomplished in many different ways. For example, in some embodiments the user may provide the device IDs to the provider of the content. In some embodiments the stream may be provided to the first 2, 3, 4, etc., client devices that request the stream. Again, the number of authorized client devices may comprise any number and may be specified by the rental agreement and implemented by the server.

In some embodiments, such a scheme may be implemented by issuing the user a user ID as part of the rental agreement. For example, when the user attempts to play the content and a request for the stream is sent to the server, the server may respond with a request for the user ID from the user. The user ID may be requested for each device attempting to play the content. This may help prevent others from playing the content since they may not have the user ID.

The use of a user ID may comprise another way in which the extent to which a user may use the streamed second portion of the data may be limited. For example, in some embodiments the server may be permitted by the rental agreement to provide the streamed second portion of the data to any device so long as the user ID is provided to the server. This may allow the user to play the content on a friend's player device similar to the way a conventional rented DVD may be carried to a friend's house and played. In some embodiments, however, the rental agreement may still specify that the stream may not be provided simultaneously to more than one device at a time. In such embodiments the server may deny a request for the stream if the stream is already being provided to another device for the same first portion of the data.

Thus, in some embodiments upon receiving a request or other indication that the streamed second portion of the data is needed, the server may be configured to determine whether or not streaming the second portion of the data to that particular client device for the provided user ID is authorized. In some embodiments, the request or other indication that the streamed second portion of the data is needed may include the bulk data ID, device ID, and/or user ID. That is, such information may be included with the request or other indication so that the server does not have to request it from the client player device. It should be well understood, however, that all of the above-described scenarios are just a few examples and that many other scenarios may be implemented in accordance with various embodiments of the present invention.

Figure 7:
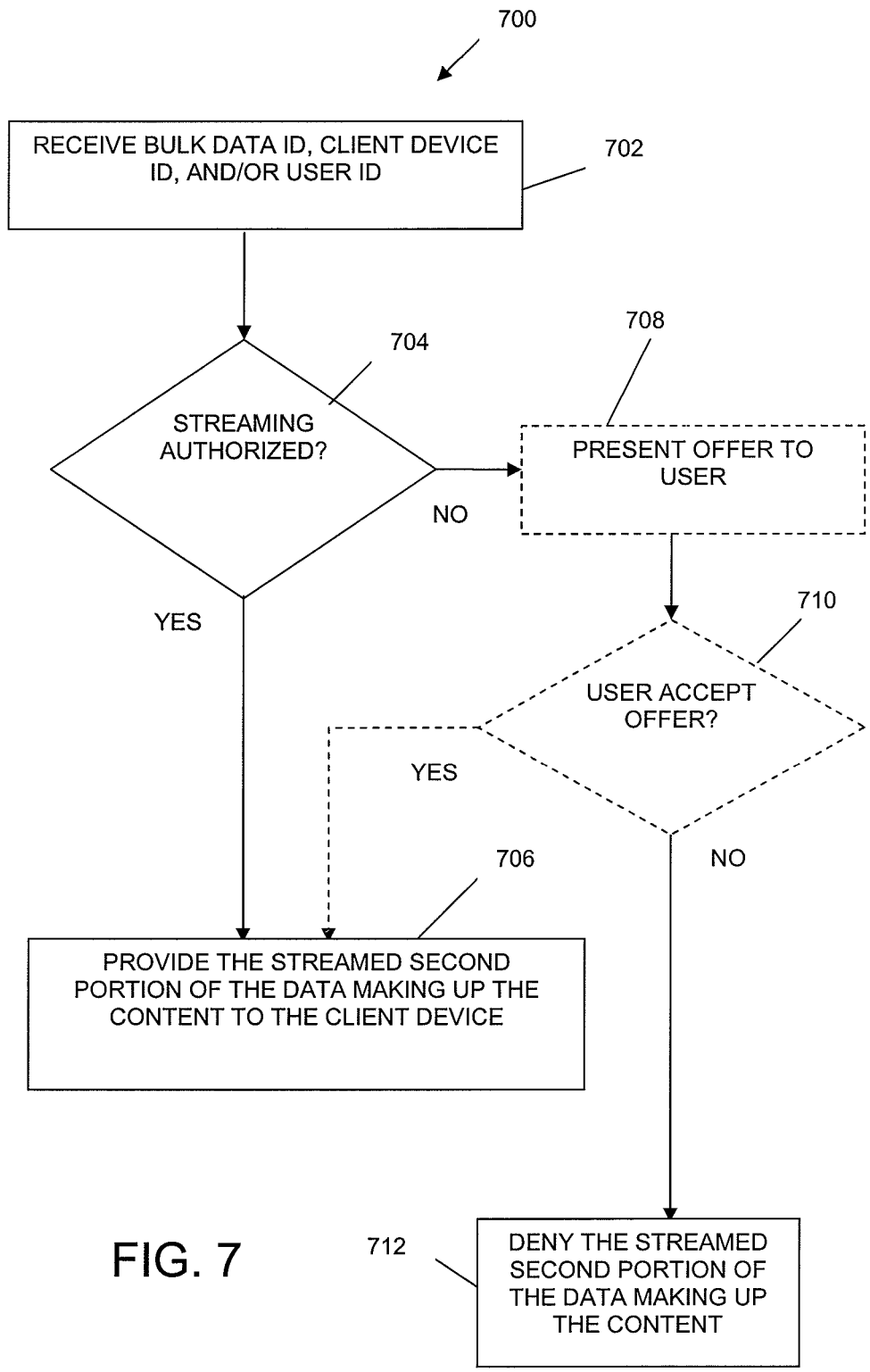
FIG. 7 is a flow diagram illustrating a method for use in providing content in accordance with an embodiment of the present invention.

FIG. 7 illustrates a method 700 that operates in accordance with an embodiment of the present invention. A server or other processor based system may be configured to execute the method 700, which may be used to determine whether streaming the second portion of the data is authorized. Specifically, in step 702 the server may be configured to receive a bulk data ID, client device ID, user ID, or any combination of one or more of these IDs. In step 704 the server uses the appropriate received ID as described above to determine whether or not streaming the second portion of the data to the client device is authorized. If the streaming is authorized, then the stream is provided to the client device in step 706.

The various embodiments described above may allow the discs having the first portion of data to be shared with friends and family. Such embodiments may also allow end users to copy the discs themselves. This is because the extent to which a user may use the streamed second portion of the data may be limited, such as for example according to any of the ways described above. Because a content provider does not have to worry about the discs being copied, distribution of the media can go beyond postal mail to include in-store promotions, magazine covers, check out at the supermarket, free or promotional giveaways of discs, etc.

For example, in some embodiments discs having the first portion of the data for a given item of content may be given away, such as through a promotion or the like. When a user inserts one of these discs into his or her player and presses "play," the player or other client device may automatically connect to the Internet or other network and send to the server a request or other indication that the streamed second portion of data is needed, as described above. In response to this request, the server may send a communication back to the player which then presents an offer to the user to enter into a rental agreement, purchase agreement, or some other arrangement in order for the streamed second portion of the data to be provided to the player. If the user agrees to sign up, then the stream is provided. If the user does not agree, then the stream is not provided and the user is unable to play the content. Because the disc is cannot be played without the streamed second portion of the data, there is very little loss, if any, on the part of the content provider in giving the disc away.

An embodiment of a similar scheme is illustrated in FIG. 7. Namely, if in step 704 the server determines that streaming is not authorized, then before streaming is denied the user may optionally be presented with the above-described offer for the user to enter into a rental or other agreement to receive the stream, as is indicated by optional step 708. In optional step 710 the server determines whether or not the user accepts the offer. If so, then the stream is provided to the client device in step 706. If not, then in step 712 the streamed second portion of the data making up the content is denied.

The various embodiments described above may allow multiple discs having the first portion of data for various items of content to be sent in a single mailer to a user. For example, a user's preferences and watching habits may be tracked, and then a content provider may send multiple discs to a user based on those preferences and watching habits. When the user attempts to play one of the discs, an offer will be presented to the user to enter into a rental agreement, purchase agreement, or some other arrangement in order for the streamed second portion of the data to be provided to the user, as described above. In some embodiments, custom compilations of content may be created and provided on one or more discs, such as one or more Blu-ray discs or other media. When the user attempts to play some of the content, an offer may be presented to the user similar to as described above.

Thus, one or more of the above described techniques may be used for implementing a movie or other content distribution system to distribute content using discs or other physical media, retail outlet stores, content rental websites, warehouse and mail delivery systems and techniques, downloading systems, P2P file sharing schemes, or any other means for distributing the bulk first portions of the data for given items of content. Then, streaming techniques may be used for delivery of the second portions of the data.

As mentioned above, the client device 102 (FIG. 1A) may comprise a DVD player, CD player, game console, entertainment system, handheld device, computer, or any other type of device that plays media. Moreover, the methods and techniques described herein may be utilized, implemented and/or run on many different types of computers, graphics workstations, televisions, entertainment systems, video game systems, DVD players, DVRs, media players, home servers, video game consoles, and the like. Referring to FIG. 8, there is illustrated a system 800 that may be used for any such implementations of client devices in order to utilize, implement and/or execute the methods and techniques described herein. Use of the system 800, however, is certainly not required.

By way of example, the system 800 may include, but is not required to include, a central processing unit (CPU) 802, a graphics processing unit (GPU) 804, digital differential analysis (DDA) hardware 806, a random access memory (RAM) 808, and a mass storage unit 810, such as a disc drive. Thus, in some embodiments the system 800 comprises a processor based system. The system 800 may be coupled to, or integrated with, a display 812, such as for example any type of display.

The CPU 802 and/or GPU 804 may be used to execute or assist in executing the steps of the methods and techniques described herein, and various program content and images may be rendered on the display 812. Removable storage media 814 may optionally be used with the mass storage unit 810, which may be used for storing code that implements any of the methods and/or techniques described herein. However, any of the storage devices, such as the RAM 808 or mass storage unit 810, may be used for storing such code. Either all or a portion of the system 800 may be embodied in any type of device, such as for example a television, computer, video game console or system, handheld device, or any other type of device, including any type of device mentioned herein.

While the invention herein disclosed has been described by means of specific embodiments and applications thereof, numerous modifications and variations could be made thereto by those skilled in the art without departing from the scope of the invention set forth in the claims.

What is claimed is:

1. A method comprising:
    partitioning content being constituted of a set of data according to a method of partitioning, such that the set of data is partitioned into a first portion of data and a second portion of data;
    providing the first portion of the data to a user, wherein the first portion of the data comprises a data identification (ID); and
    making available for a limited amount of time an ability to stream the second portion of the data to a device having the first portion of the data;
    wherein the second portion of the data includes essential information for reconstructing the content;
    wherein the making available the ability to stream the second portion of data is performed by a processor-based machine and comprises receiving the data ID and using the data ID to determine whether streaming the second portion of the data is authorized; and
    wherein neither a device ID nor a user ID are used to determine whether streaming the second portion of the data is authorized.

2. A method in accordance with claim 1, wherein the first portion of the data is provided to the user on a physical storage medium.

3. A method in accordance with claim 1, wherein the first portion of the data is provided to the user by downloading.

4. A method in accordance with claim 1, wherein the first portion of the data is provided to the user via a peer-to-peer (P2P) file sharing scheme.

5. A method in accordance with claim 1, wherein the step of making available for a limited amount of time an ability to stream a second portion of the data further comprises making such stream available pursuant to a rental arrangement.

6. A method in accordance with claim 5, wherein the rental arrangement specifies the limited amount of time.

7. A method in accordance with claim 1, wherein the step of making available for a limited amount of time an ability to stream a second portion of the data further comprises making such stream available pursuant to a purchase arrangement.

8. A method in accordance with claim 1, wherein the step of making available for a limited amount of time an ability to stream a second portion of the data further comprises making only one such stream available at a time for the data ID.

9. A method in accordance with claim 1, wherein the first portion of the data is given to the user for free.

10. A method in accordance with claim 1, further comprising:
    presenting an offer to the user for receiving the streamed second portion of the data when it is determined that streaming the second portion of the data is not authorized.

11. A non-transitory storage medium storing a computer program executable by a processor based system, the computer program causing the processor based system to execute steps comprising:
    receiving from a device having a first portion of data corresponding to a content an indication that the device is attempting to play the content, the content being constituted of a set of data being partitioned into the first portion of data and a second portion of data; and
    making available for a limited amount of time an ability to stream the second portion of the data to the device;
    wherein the second portion of the data includes essential information for reconstructing the content;
    wherein the making available the ability to stream the second portion of the data comprises:
        receiving a data identification (ID) that is included in the first portion of the data and determining whether the streaming of the second portion is authorized based on the data ID, and
        making available the ability to stream the second portion of the data when it is determined that the streaming the second portion of the data is authorized;
    wherein neither a device ID nor a user ID are used to determine whether streaming the second portion of the data is authorized.

12. A non-transitory storage medium in accordance with claim 11, wherein the step of making available for the limited amount of time an ability to stream the second portion of the data further comprises making such stream available pursuant to a rental arrangement.

13. A non-transitory storage medium in accordance with claim 12, wherein the rental arrangement specifies the limited amount of time.

14. A non-transitory storage medium in accordance with claim 11, wherein the determining whether the streaming the second portion of the data is authorized comprises:
    using the data ID to determine an allowed number of streams corresponding to the data ID, wherein the allowed number of streams comprises one of a number of streams at a given time and a total number of streams; and
    wherein the determining whether the streaming the second portion of data is authorized comprises determining whether the number of streams provided at the time of receiving the indication that the device is attempting to play the content is less than or equal to the allowed number of streams.

15. A non-transitory storage medium in accordance with claim 11, wherein the step of making available for the limited amount of time an ability to stream the second portion of the data further comprises making only one such stream available at a time for the data ID.

16. A non-transitory storage medium in accordance with claim 11, further comprising sending information to the device for presenting an offer to a user for receiving the streamed second portion of the data when it is determined that the streaming the second portion of the data is not authorized.

17. A system comprising:
    means for partitioning content being constituted of a set of data according to a method of partitioning, such that the set of data is partitioned into a first portion of data and a second portion of data;
    means for providing the first portion of the data to a user, wherein the first portion of the data comprises a data identification (ID); and
    a processor based system configured to make available for a limited amount of time an ability to stream the second portion of the data to a device having the first portion of the data;
    wherein the second portion of the data includes essential information for reconstructing the content; and wherein the processor based system configured to make available the ability to stream the second portion of data is configured to execute steps comprising:
  receiving the data ID and determining whether streaming the second portion of the data is authorized using the data ID; and
  making available the ability to stream the second portion of data when it is determine that the streaming is authorized;
  wherein neither a device ID nor a user ID are used to determine whether streaming the second portion of the data is authorized.

18. A system in accordance with claim 17, wherein the means for providing the first portion of the data comprises a system for providing to the user one or more physical storage mediums that include the first portion of the data.

19. A system in accordance with claim 17, wherein the means for providing the first portion of the data comprises a system for allowing the user to download the first portion of the data.

20. A system in accordance with claim 17, wherein the means for providing the first portion of the data comprises a peer-to-peer (P2P) file sharing scheme.

21. A system in accordance with claim 17, wherein the processor based system is further configured to make available the ability to stream the second portion of the data pursuant to a rental arrangement.

22. A system in accordance with claim 21, wherein the rental arrangement specifies the limited amount of time.

23. A system in accordance with claim 17, wherein the processor based system is further configured to make available the ability to stream the second portion of the data pursuant to a purchase arrangement.

24. A system in accordance with claim 17, wherein the processor based system is further configured to make available only one stream of the second portion of the data at a time for the data ID.

25. A system in accordance with claim 17, wherein the processor based system is further configured to present an offer to the user for receiving the streamed second portion of the data when it is determined that streaming the second portion of the data is not authorized.

* * * * *